(12) United States Patent
Patterson

(10) Patent No.: US 10,595,518 B1
(45) Date of Patent: Mar. 24, 2020

(54) NETTING APPARATUS

(71) Applicant: Kenneth W. Patterson, Ocala, FL (US)

(72) Inventor: Kenneth W. Patterson, Ocala, FL (US)

( * ) Notice: Subject to any disclaimer, the term of this patent is extended or adjusted under 35 U.S.C. 154(b) by 0 days.

(21) Appl. No.: 16/526,999

(22) Filed: Jul. 30, 2019

(51) Int. Cl.
*A01K 77/00* (2006.01)
*A01K 74/00* (2006.01)

(52) U.S. Cl.
CPC .............. *A01K 77/00* (2013.01); *A01K 74/00* (2013.01)

(58) Field of Classification Search
CPC ......... A01K 74/00; A01K 77/00; A01M 3/00; A01M 3/002
USPC .............................................. 43/5, 7, 11, 12
See application file for complete search history.

(56) References Cited

U.S. PATENT DOCUMENTS

| | | | | |
|---|---|---|---|---|
| 800,029 A * | 9/1905 | Terletzky | ................ | A01M 3/00 43/134 |
| 1,240,787 A * | 9/1917 | Van Horn | .............. | A01K 77/00 43/12 |
| 4,003,595 A * | 1/1977 | Fano | .................... | A01K 23/005 294/1.5 |
| 4,776,129 A * | 10/1988 | Kelly | .................... | A01M 3/002 43/133 |
| 5,276,995 A * | 1/1994 | Johnson | ................. | A01K 77/00 43/11 |
| 5,501,026 A * | 3/1996 | Bryant | .................... | A01K 77/00 43/11 |
| 6,598,335 B2 * | 7/2003 | Akhtar | ................. | A01K 23/005 43/12 |
| 2010/0132242 A1* | 6/2010 | Emter, Jr. | .............. | A01K 77/00 43/11 |

* cited by examiner

*Primary Examiner* — Darren W Ark
*Assistant Examiner* — Steven J Shur
(74) *Attorney, Agent, or Firm* — Massinger Law Offices

(57) ABSTRACT

A netting apparatus especially useful for underwater use for the capture of crustaceans and other prey is capable of one-handed rapid net mouth closure. The apparatus includes an elongate handle coupled distally with a hoop and a flexible net mounted about the circumference of the hoop opening to form a net bunt. Access into and out of the net bunt is selectively restricted by a unique net closure mechanism associated with the handle, hoop and net. The net closure mechanism includes a pair of elastic bands disposed across the hoop opening with the net disposed between the bands to create the net mouth. A drawing apparatus is adapted to stretch the bands apart from one another from their normally relaxed substantially parallel orientation wherein the net mouth is said to be "closed" to its "open" position wherein the bands are held under tension. Releasing tension on the bands is carried out by activating a trigger on the handle causing the bands to rapidly return to their closed position for capture of prey within the net bunt.

11 Claims, 15 Drawing Sheets

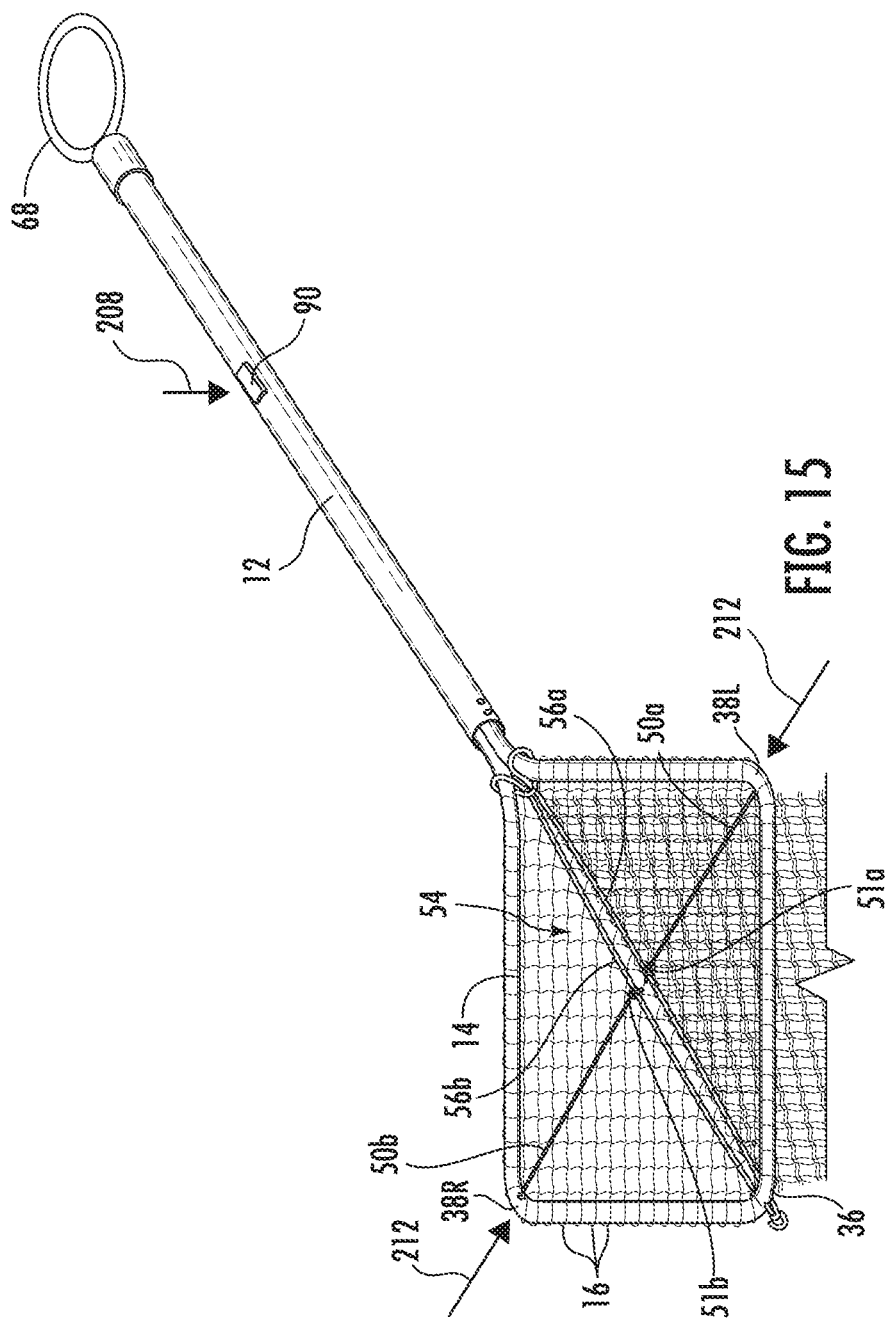

NETTING APPARATUS

FIELD OF THE INVENTION

The present invention is directed generally to a netting apparatus adapted for the capture of underwater wildlife and more particularly to a hand-held netting apparatus especially useful for the capture of lobster and other crustaceans by divers.

BACKGROUND OF THE INVENTION

Many diving enthusiasts, whether they prefer snorkeling, free diving, scuba diving or the like, enjoy capturing sea creatures such as lobster, crab, fish and the like for either examination or consumption. Netting devices are known and widely used to capture these sea creatures and transport them to the surface of the water. The shape and function of the basic "capture net" has remained virtually unchanged throughout the past several decades although various modifications have been made in an effort to reduce the sea creatures' chances of escape once netted. Some such "improved" capture nets employ a snare-type net closure to retain the sea creature in the net bunt, but many of these require two hands to deploy, close the net too slowly, contain overly complex internal parts, and/or require disengagement of the closure mechanism to retrieve the sea creature from the net. Moreover, the round or oval shape of the hoop of a traditional capture net leaves room for improvement. During the netting process it is required that the hoop be positioned on the ground (sea floor) immediately behind the lobster as it kicks backwards in an attempt to escape a probing rod held in the diver's opposite hand. The traditional rounded hoop shape thus utilizes a curved structure set on a flat one. The limited area of contact between the curved hoop and the ground leaves significant room left and right of the hoop for the lobster to avoid the hoop opening. It would be desirable to have a netting apparatus with a hoop shape more conducive to capturing sea creatures such as lobster that dwell on the sea floor and swim substantially parallel thereto when teased into movement by the diver. It would further be desirable to have such an improved netting apparatus that may be held at a convenient angle by the diver as he or she swims parallel to the sea floor in search of prey. Based on the above, there is a need in the art for additional improvements to netting devices adapted for the capture of sea creatures, especially lobster, by divers.

SUMMARY OF THE INVENTION

The subject invention obviates many of the foregoing deficiencies and limitations of netting devices of the prior art, and meets the above-described needs of divers, by providing a hand-held netting apparatus capable of rapid closure using only a single hand, the closure mechanism being simple in design relative to those of the prior art and permitting access to and retrieval of the captured prey without reconfiguring the net to an open condition. Embodiments of the improved netting apparatus described herein include a hoop shape that increases the surface area of hoop-to-ground contact relative to traditional nets, while simultaneously providing a handle-to-ground angle that makes the device both comfortable to hold and manipulate.

More specifically, embodiments of the diver's net of the subject invention include a hollow elongate handle supporting distally a substantially hollow tubular hoop, the hoop defining a hoop opening, and a net having a perimeter threaded about the circumference of the hoop to form a net bunt. In preferred embodiments the hoop is substantially square-shaped having a first pair of corners (proximal and distal) intersected by the longitudinal axis of the handle, and a second pair of opposing corners (left and right) sharing an axis orthogonal to the longitudinal axis of the handle. A pair of elastic bands are mounted in parallel and under relatively low tension across the hoop opening, adjacent to the longitudinal axis of the handle. The net is gathered inwardly from the hoop circumference and disposed between the pair of bands with the bunt portion of the net depending to one side of the hoop opening. Thusly arranged, the area between the bands define a net mouth which serves as the gateway into and out of the net bunt. When the opposing bands are in their substantially relaxed, substantially parallel orientation relative to one another, the net mouth is said to be in a closed condition. A cocking mechanism attached to the midpoint of each closure band is employed to selectively draw the center of the bands away from one another, outwardly toward and in proximity to the second pair of opposing corners of the hoop, thus opening the net mouth. When the net mouth is in an open condition it defines the sole opening of the net of sufficient size to permit passage of a sea creature into and out of the net bunt. The bands are in a stretched, extended "cocked" condition possessing stored elastic potential energy. The cocking mechanism releasably retains the bands in the cocked condition with the net mouth open. When a sea creature is netted into the bunt, the net mouth is caused to rapidly close by activation of a trigger located on the proximal end of the handle. This action releases the bands from their cocked condition, converting their potential energy into kinetic energy, allowing the bands to spring back together, thus closing the net mouth and preventing the sea creature's escape. The user can retrieve the sea creature by inserting a hand between the parallel elastic bands into the net bunt; the bands remaining biased against the user's hand thus eliminating the need for opening of the net mouth via the cocking mechanism. The 45-degree handle-to-hoop angle facilitates orientation of the net in front of the diver when swimming parallel to the sea floor and approaching prey while the unique squared hoop design permits either of the two leading sides of the hoop to be placed flat on the ground (sea floor) behind a lobster to minimize pre-netted escape routes.

Accordingly, in one embodiment, the subject netting apparatus is comprised of: a) a handle comprising a substantially hollow shaft having a side wall defining a void; the shaft further comprising a proximal end and a distal end; b) a hoop comprising a substantially hollow tube, the hoop having a circumference defining an opening, the tube comprising a side wall defining a void; the handle being distally coupled to the hoop at a coupling point; the hoop further having an apex opposite the coupling point; the handle, the coupling point and the apex sharing a common axis, the axis dividing the hoop into a first hoop portion and a second hoop portion; the first hoop portion and the second hoop portion each having an aperture disposed therethrough; the void of the shaft being in communication with the void of the hoop; c) a flexible net comprising a net bunt and a net mouth; the net mouth having an open position and a substantially closed position; the net being attached to the hoop substantially around said hoop circumference to form the net bunt; the net bunt extendable to one side of said opening of the hoop; d) a net closure mechanism adaptable for selective movement of the net mouth to the open position or to the substantially closed position, the net closure mechanism comprising a first elastic band, a second elastic band, and a drawing apparatus; the first elastic and the second elastic band each disposed longitudinally across the hoop opening from the attachment point to the apex; the first elastic and the second elastic band having a space in between; the net bunt being disposed between the first elastic band and the second elastic band; the space defining the boundaries of the net mouth; the drawing apparatus comprising, a first draw line having a distal end and a proximal end, the distal end of the first draw line being attached to the first elastic band; a portion of the first elastic band being disposed through the aperture of the first hoop portion, a portion of the hoop void and a portion of the handle void; a second draw line having a distal end and a proximal end, the distal end of the second draw line being attached to the second elastic band; a portion of the second elastic band being disposed through said aperture of the second hoop portion, a portion of the hoop void and a portion of the handle void; the proximal end of the first and the second draw line being coupled to a draw member; the draw member partially disposed within the void of the handle; the draw member having an external portion adapted for manual reciprocating movement of the draw member within the void of the handle; whereby the first and second draw lines may be retracted proximally a distance into the handle by retracting the draw member toward the proximal end of the handle to stretch the first band outwardly toward and in proximity to the aperture of the first hoop portion, and to stretch the second band outwardly toward and in proximity to the aperture of the second hoop portion, thus placing the first and the second bands under tension and opening the net mouth; and whereby the net mouth may be rapidly returned its substantially closed position for capturing prey within the net bunt by releasing tension on the first and second bands.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is, therefore, a primary object of the subject invention to provide a hand-held netting apparatus for divers, the apparatus having a handle coupled to a preferably square-shaped hoop coupled to a net, the net being in communication with an elastic net mouth having selectable open and closed conditions and being capable of rapid closure upon one-handed operation by the user.

It is another primary object of the subject invention to provide such a netting apparatus wherein the elastic net mouth is comprised of a pair of elastic bands disposed across the hoop opening, the elastic bands possessing stored potential energy when the net mouth is open, the stored potential energy being transformable to kinetic energy which causes the net mouth to rapidly close when the closure mechanism is triggered by the user.

Another object of the subject invention is to provide a such a netting apparatus with components that are conducive to underwater use, thus being resistant to deterioration when exposed to water; especially salt water.

Another object of the subject invention is to provide a netting apparatus which is relatively simple in design and therefore is capable of easy operation, of rapid construction at relatively low costs, and not prone to breakage.

These together with other objects of the invention, along with the various features of novelty which characterize the invention, are pointed out with particularity in the claims annexed to and forming a part of this disclosure. For a better understanding of the invention, its advantages and the specific objects attained by its uses, reference should be had to the accompanying drawings and descriptive matter in which there is illustrated a preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 15 a side perspective view of the netting apparatus of FIG. 8 with the trigger deployed to release the sear and draw strings.

DETAILED DESCRIPTION OF THE PREFERRED EMBODIMENT

Figure 1:
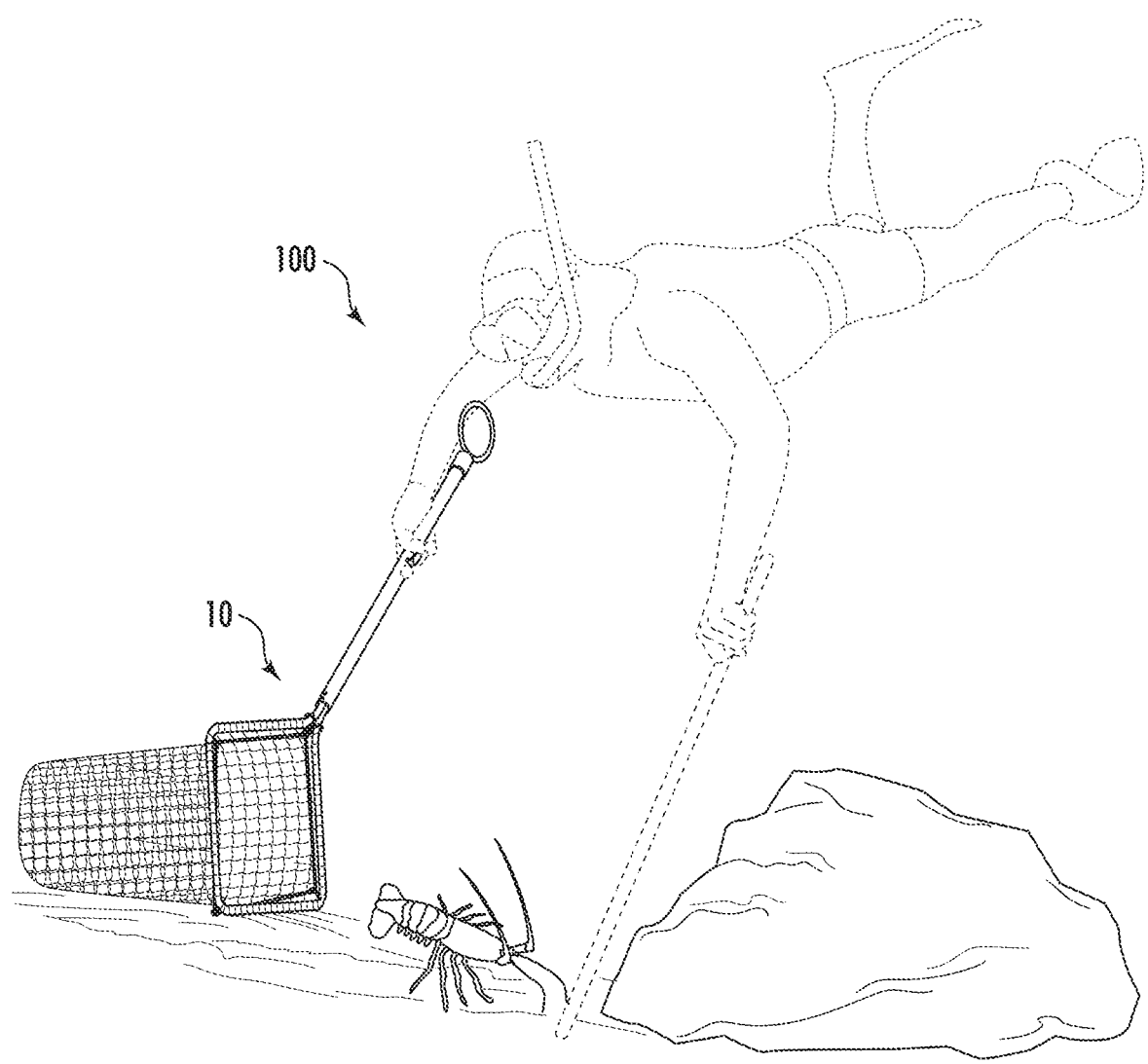
FIG. 1 is a perspective view of a netting apparatus of the subject invention used by a diver.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. The figures provided herewith are for explanation purposes to persons ordinarily skilled in the art and that the drawings are not necessarily drawn to scale.

In addition, as used in the following description, any reference to terms of orientation such as "horizontal", "vertical", "front", "rear", "left", "right", "up", "down", "inward" or "outward", as well as adjectival and adverbial derivatives thereof (e.g., "horizontally", "vertically", "forwardly", "rearwardly", "leftward", "rightward", "upward", "downward", "inwardly", "outwardly"), generally refer to the orientation of a surface or structure relative to its axis of elongation, or axis of rotation, as appropriate. The terms "proximal" and "distal" as well as adjectival and adverbial derivatives thereof (e.g., "proximally" and "distally"), generally refer to the orientation of a structure relative to a user holding the subject apparatus for its intended use (i.e., "proximally" means in a direction closer to the user while "distally" means in a direction away from the user). One of ordinary skill in the art will also appreciate that a component may be designed as multiple components or that multiple components may be designed as a single component.

Furthermore, reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

Figure 2:
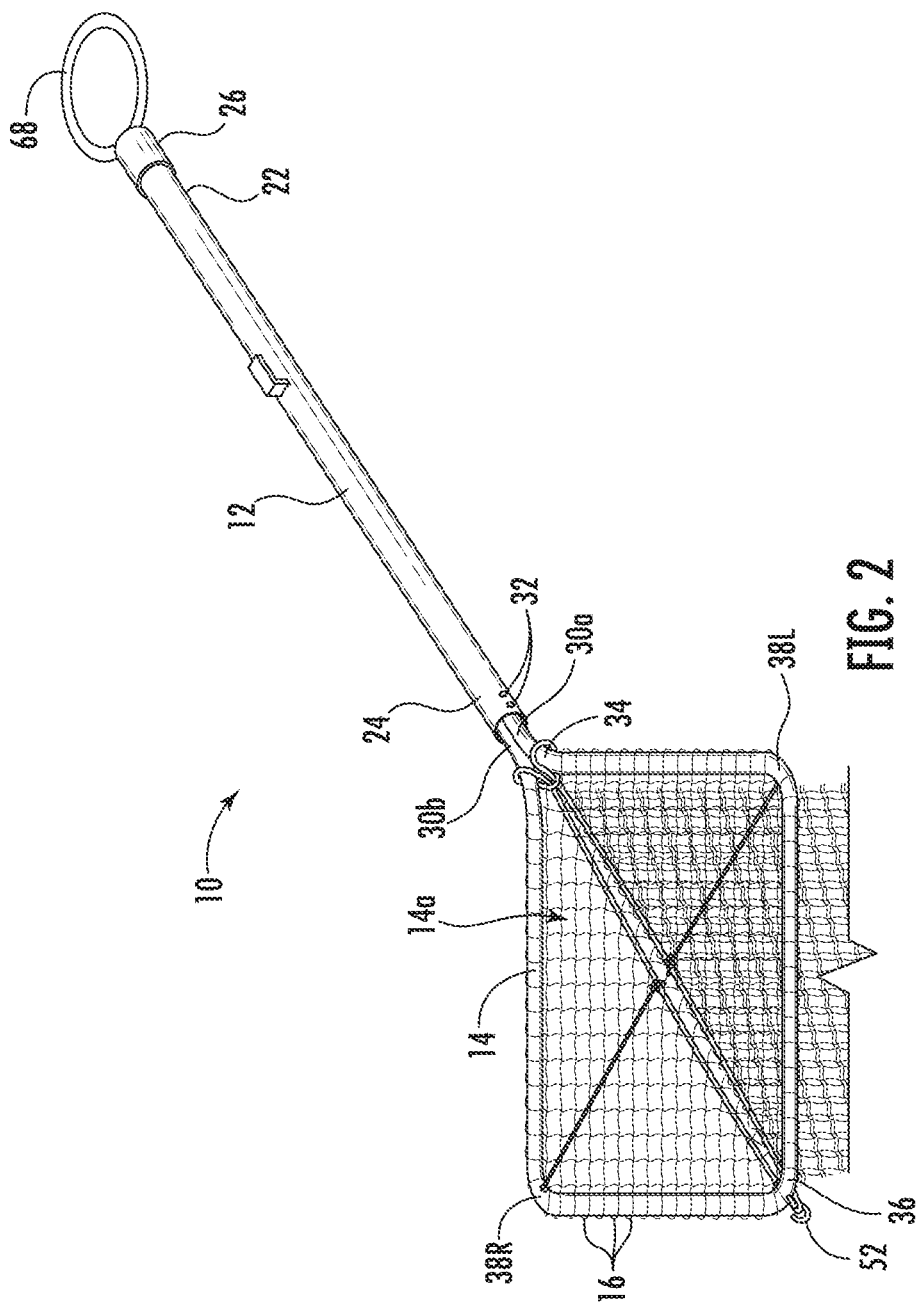
FIG. 2 is a perspective view of a netting apparatus of the subject invention with the net mouth closed.
Figure 3:
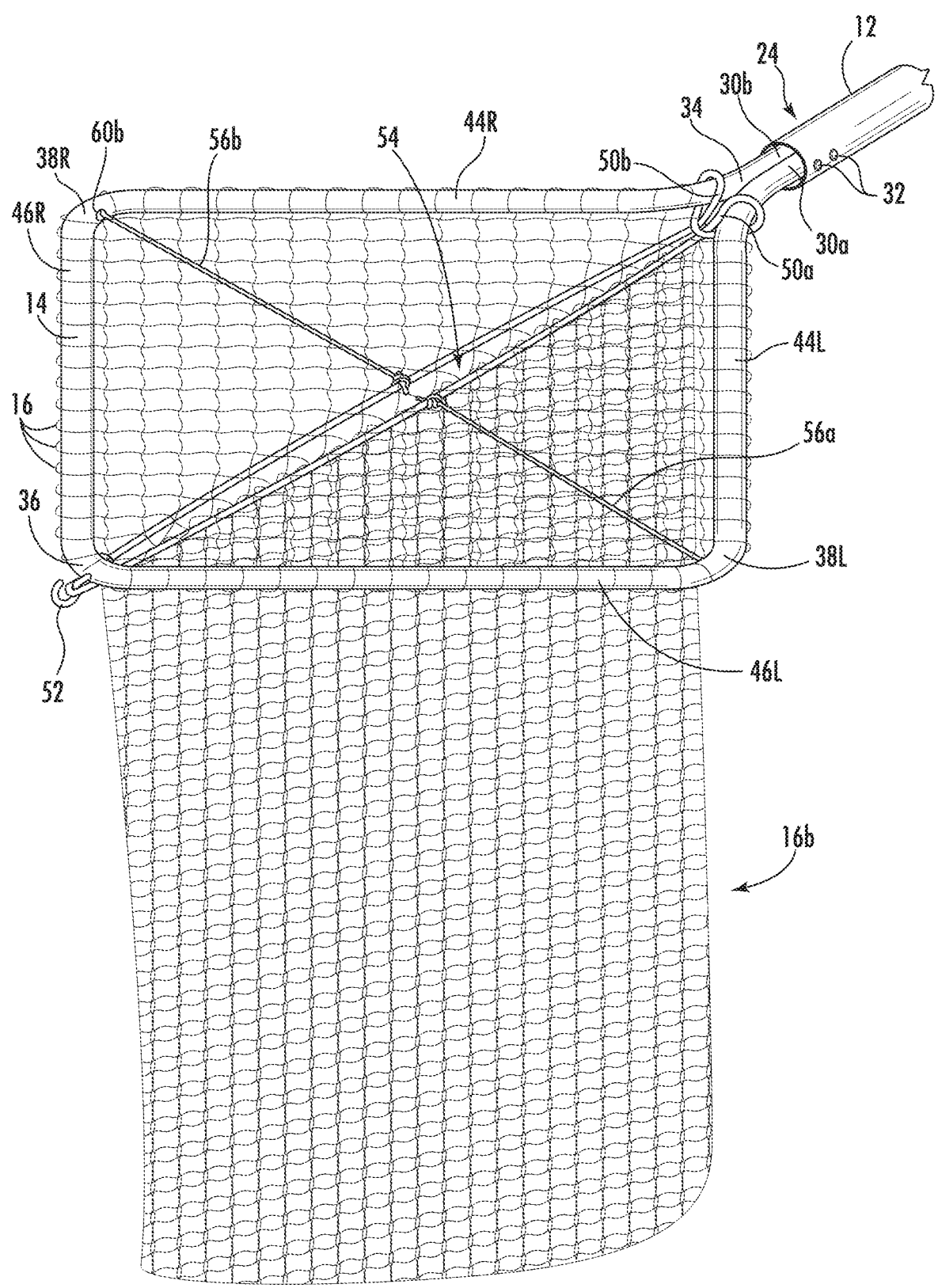
FIG. 3 is an enlarged perspective view of the net and hoop arrangement of a netting apparatus of the subject invention with the net mouth closed.
Figure 4:
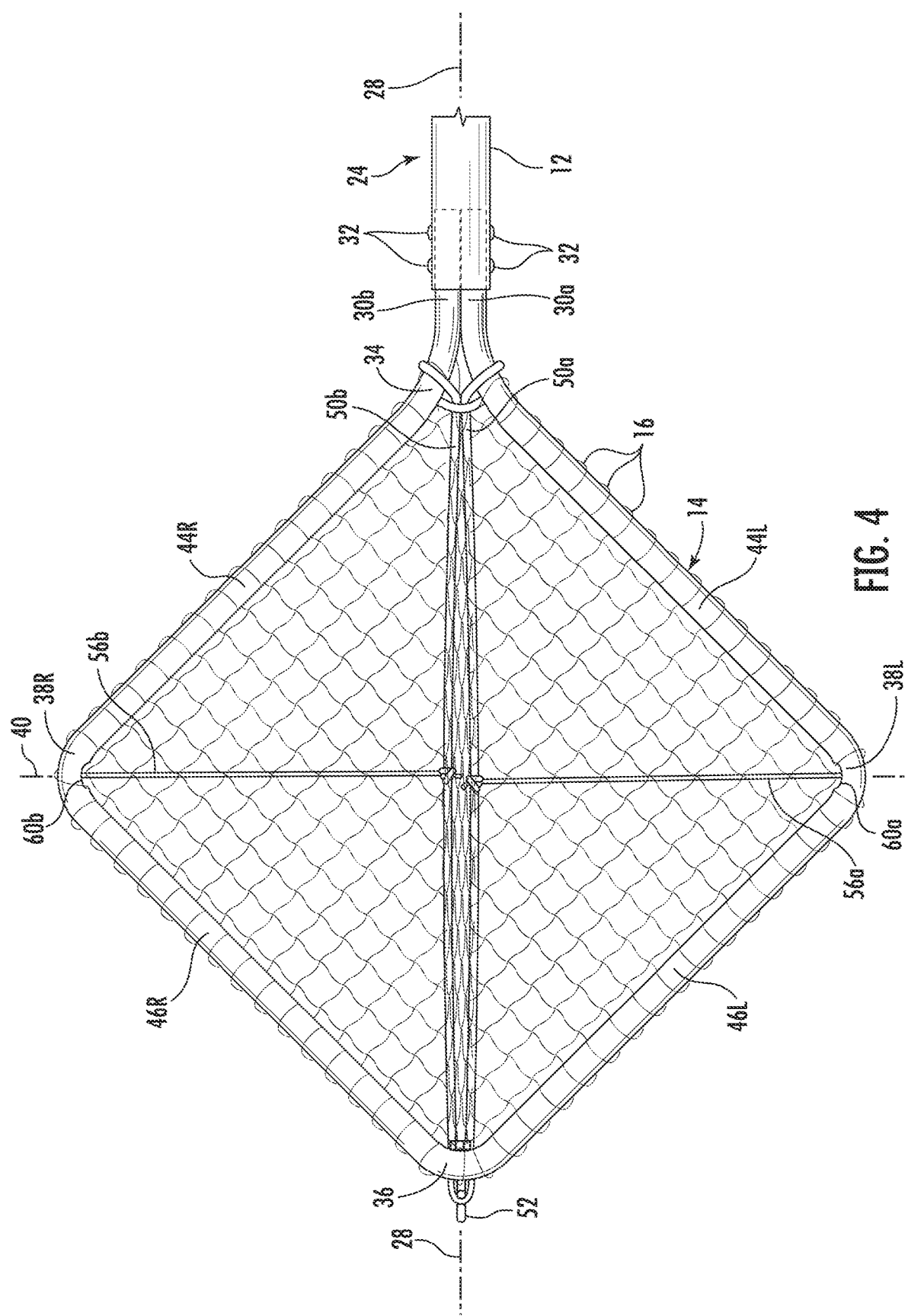
FIG. 4 is an enlarged plan view of the net and hoop arrangement of a netting apparatus of the subject invention with the net mouth closed.

Reference is first made to FIGS. 2-4 in which there is illustrated a netting apparatus of the subject invention, designated generally by reference numeral 10. Netting apparatus 10 is comprised of an elongate handle 12 coupled distally with a hoop 14 having a circumference defining a hoop opening 14a, and a flexible net 16 mounted by threading about the circumference of hoop opening 14a to form a net bunt 16b. Net 16 is made of any suitable netting material which, as used herein, means an open-mesh material made of rope, string, wire or plastic, for instance, twisted, knotted, woven or otherwise connected together at regular intervals to form spaces for allowing gas, liquid, or small objects to pass through but sized to prevent passage of larger objects such as the sea creatures for which the subject apparatus is used to capture. Access into and out of net bunt 16b is selectively restricted by a unique net closure mechanism associated with the handle 12, hoop 14 and net 16, as disclosed below.

Handle 12 comprises a substantially hollow shaft having a side wall 20, preferably but not essentially circular in cross-section, the shaft having proximal and distal ends 22 and 24, respectively, and an interior space or "void" 12v therebetween. Handle 12 may be made of any rigid material resistant to corrosion from exposure to water, especially salt water. Galvanized aluminum or various plastics are contemplated, for instance. An end cap 26 is secured over the open proximal end 22 via a pressure fit or reciprocal threading, for instance. In some embodiments, a plug (not shown) mounted to the interior surface of side wall 20 is used to close off proximal end 22 of handle 12 rather than the above-described end cap which is mounted about the exterior surface of side wall 20.

Hoop 14 of netting apparatus 10 comprises a substantially hollow rigid tube, preferably but not essentially of galvanized aluminum, plastic or other suitable corrosion-resistant or corrosion-proof material, the tube comprising a side wall 30, preferably but not essentially circular in cross-section, the side wall defining an interior space or "void" 14v. Hoop 14 is formed by bending or otherwise forming the tube into the desired hoop shape. While a traditional circular hoop shape may be employed, oval, ovoid, polygonal and curvilinear shapes are also contemplated. Accordingly, the term "circumference" as used herein is not intended to be limited to that of a circle. Moreover, while in some embodiments the opposite ends of the tube may be brought together to form a hoop of the closed loop variety, in other embodiments the opposite ends of the tube are bent such that they extend radially from the hoop circumference to form first and second parallel and abutting stems 30a,30b, respectively. As best observed upon reference to FIGS. 4 and 5, first and second stems 30a,30b are inserted into the distal end 22 of handle 12 at a connection point, parallel to its longitudinal axis 28, and secured via fasteners 32 or other suitable means including, but not limited to, welding, bonding or frictional engagement. Thusly coupled at the connection point, the longitudinal axis 28 of handle 12 bisects hoop 14 and hoop opening 14a. In all embodiments, the void 12v of handle 12 and the void 14v of hoop 14 are in communication with one another when handle 12 is coupled to hoop 14. As may be appreciated by those skilled in the art, when hoop 14 is of the closed-loop variety, the side wall 20 of hoop 14 may include an opening (not shown) about which the distal end 24 of handle 12 may be mounted to achieve the desired communication between void 12v of handle 12 and void 14v of hoop 14.

Figure 5:
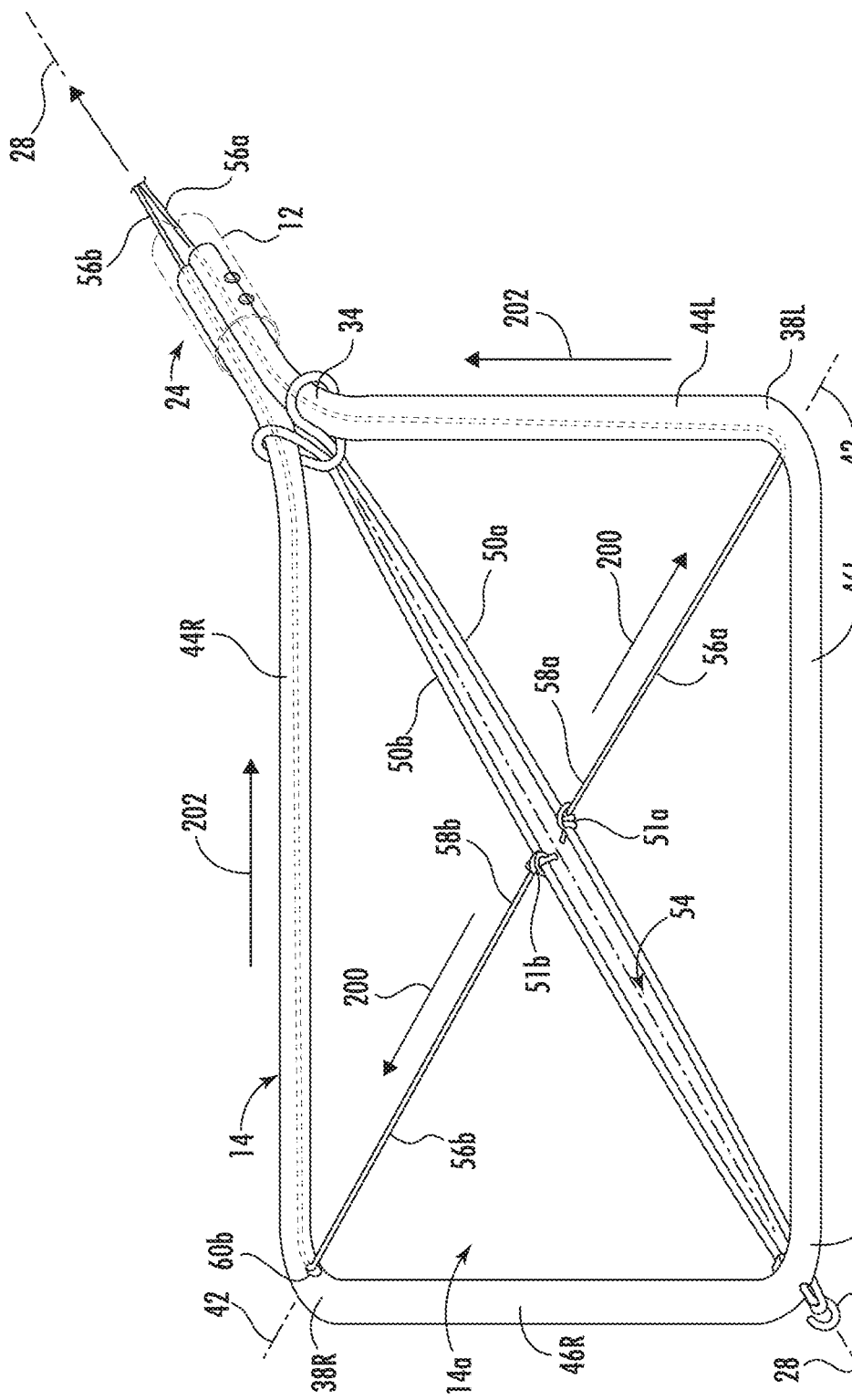
FIG. 5 is an enlarged perspective view of the hoop of FIG. 4 illustrating the arrangement of net closure band and draw string components.

With continued reference to FIGS. 4 and 5 in particular, in preferred embodiments, the hoop portion of hoop 14 is curvilinear in appearance having a generally square-shape comprising a first pair of opposing corners, namely proximal corner 34 and distal corner 36, in parallel alignment with longitudinal axis 28 of handle 12, and a second pair of opposing corners, namely left corner 38L and right corner 38R, intersected by transverse axis 42 which is orthogonal to the longitudinal axis 28 of handle 12. A first proximal hoop portion 44L is situate between and contiguous with proximal corner 34 and left corner 38L, a second proximal hoop portion 44R is situate between and contiguous with proximal corner 34 and right corner 38R, a first distal hoop portion 46L is situate between and contiguous with left hoop corner 38L and distal corner 36, and a second distal hoop portion 46R is situate between and contiguous with right hoop corner 38R and distal corner 36. In preferred embodiments, all corners 34,36,38L,38R are rounded. It is noted that proximal corner 34 is not a contiguous corner in that first proximal hoop portion 44L and second proximal hoop portion 44R do not merge, but rather abut one another and, accordingly, proximal corner 34 may be alternatively characterized as hoop "throat" 34. Additionally, in embodiments where hoop 14 is other than the above-described square-shape, distal corner 36 may be referred to as "apex" 36, and left corner 38L and right corner 38R may be referred to as "left hoop midpoint" 38L and "right hoop midpoint" 38R, respectively.

As best observed upon reference to FIG. 1, a first advantage of the generally square-shape of hoop 14 is that it permits orientation of either first or second distal hoop portion 46L, 46R flat on the ground (sea floor) while simultaneously orienting handle 12 at substantially a 45-degree angle relative to the sea floor. Having a four-sided hoop permits greater surface area contact between hoop 14 and the sea floor relative to a traditional circular hoop design, thus reducing the chance of a lobster's avoidance of being netted as it swims along the sea floor. Moreover, the aforesaid angle of orientation of handle 12 relative to the sea floor provides a comfortable angle for a diver 100 to hold, manipulate and view netting device 12 when either standing on (not shown), or swimming parallel to and above, the sea floor in search of prey.

The netting apparatus of the subject invention further includes a novel net closure mechanism capable of rapid one-handed operation. The net closure mechanism is comprised of first and second elastic bands 50a,50b, respectively, disposed across hoop opening 14a and around net 16 to define the boundaries of a net mouth 54, and a drawing apparatus attached to each elastic band for selectively drawing the bands apart from one another or permitting them to resume their normally substantial parallel relationship, thereby opening and closing the net mouth, respectively. When in an open condition, the net mouth 54 serves as the sole opening of net 16 of sufficient size to permit passage of a lobster or other prey into and out of net bunt 16b. Unlike closure mechanisms of the prior art that utilize a nonelastic draw cord to close the net bunt, the netting apparatus 10 of the subject invention leverage the ability of elastic bands to store potential energy when stretched and to convert that stored energy into kinetic energy as the bands rapidly resume (e.g. "snap back into") their original undistorted length and shape to close the net mouth 54.

As best observed upon reference to FIG. 5, first and second elastic bands 50a,50b are disposed longitudinally across hoop opening 14a from throat 34 to apex 36, adjacent to longitudinal axis 28, effectively dividing hoop opening 14a into left and right halves of substantially equal area. In the embodiment illustrated, first and second elastic bands 50a,50b are formed from a single band having its opposite ends joined together to form a loop. Accordingly, first and second elastic bands 50a,50b may more accurately be described as first and second elastic band portions 50,50b.

Those skilled in the art will recognize, however, that the ends need not necessarily be joined together, and that two individual and separate elastic bands may be employed in the alternative. In this context, the key requirement is that there exist either one elastic band which may either be a loop or single length folded to form two portions arranged in side-by-side fashion, or two separate elastic bands arranged in side-by-side fashion, and in either event the pair of bands (or band portions) is disposed longitudinally across hoop 14 from throat 34 to apex 36.

Mounting of elastic bands 50a,50b to hoop 14 and across hoop opening 14a may be accomplished in a variety of ways with the exact means of doing so not being critical to the subject invention. Elastic bands 50a,50b may be attached to hoop 14 directly, or indirectly via intermediate structures such as various fasteners, or via a combination of both methods. In an embodiment, elastic bands 50a,50b are, as mentioned above, fashioned as a continuous loop. Mounting of the loop to hoop 14 may be accomplished, for example, by inserting handle 12 through the loop, draping the loop over hoop throat 34, inserting the hanging end (or "free end") of the loop through hoop opening 14a and through that portion of the loop spanning first and second proximal hoop portions 44L,44R, pulling the free end distally across hoop opening 14a, and attaching the free end to a band fastener 52 attached to distal corner 36. In the embodiment illustrated in FIGS. 2-5, band fastener 52 is comprised of a hook disposed through distal corner 36 and secured with a nut. The free end of the loop is slipped over the hook to complete mounting of the elastic bands to hoop 14.

Once mounted to hoop 14, elastic bands 50a,50b are each in a substantially linear shape. Although some stretching of elastic bands 50a,50b may occur when mounted to hoop 14 (i.e., they are under a degree of tension) the difference between each band's stretched length vs its natural length (i.e., its extension length) is minimal relative to its stretch potential, or modulus of elasticity. In plain terms, each elastic band is sized such that when mounted across hoop opening 14a, it is under the minimal amount of tension required to be substantially free of slack. Net 16 is gathered inwardly from the circumference of hoop 14 and disposed between the thusly mounted pair of elastic bands 50a,50b with net bunt 16b depending to one side of hoop opening 14a. Thusly arranged, the area between elastic bands 50a, 50b defines a net mouth 54 which serves as the gateway into and out of the net bunt for prey. When the opposing elastic bands are in their substantially relaxed, substantially unstretched, and substantially parallel orientation relative to one another, the net mouth 54 is said to be in a closed condition as shown in FIGS. 2-4. The aforementioned cocking mechanism is employed to selectively open and close net mouth 54.

In embodiments of the subject netting apparatus, the drawing apparatus comprises a flexible draw line 56 having first and second draw line portions 56a,56b, respectively, each having a distal end 58a,58b, respectively. Distal ends 58a,58b attach terminally to elastic bands 50a,50b, respectively, at junctures 51a,51b, respectively, which are located at or near the midpoint of each band. First draw line portion 56a extends from elastic band 50a through an aperture 60a disposed through side wall 30 at the inner bend of left corner 48L, through first proximal hoop portion 44L, through first stem 30a, into void 12v of handle 12, and is terminally coupled at its proximal end 62a with a rigid draw bar 64 (FIGS. 8-14) as disclosed below. Similarly, second flexible draw line portion 56b extends from elastic band 50b through aperture 60b disposed through side wall 30 at the inner bend of right corner 48R, through second proximal hoop portion 44R, through second stem 30b, into void 12v of handle 12, and is terminally coupled at its proximal end 62b with draw bar 64. It being understood that proximal ends 62a,62b converge with one another. As was the case with first and second elastic bands 50a,50b being either a unitary structure or two separate and independent bands, so too may draw line 56 be a single contiguous structure (a single draw line as shown) coupled at its midpoint to the locking mechanism (as shown), or, in the alternative, two separate and independent draw lines (not shown) in which case their respective proximal ends 62a,62b are each coupled separately to the locking mechanism.

Figure 9:
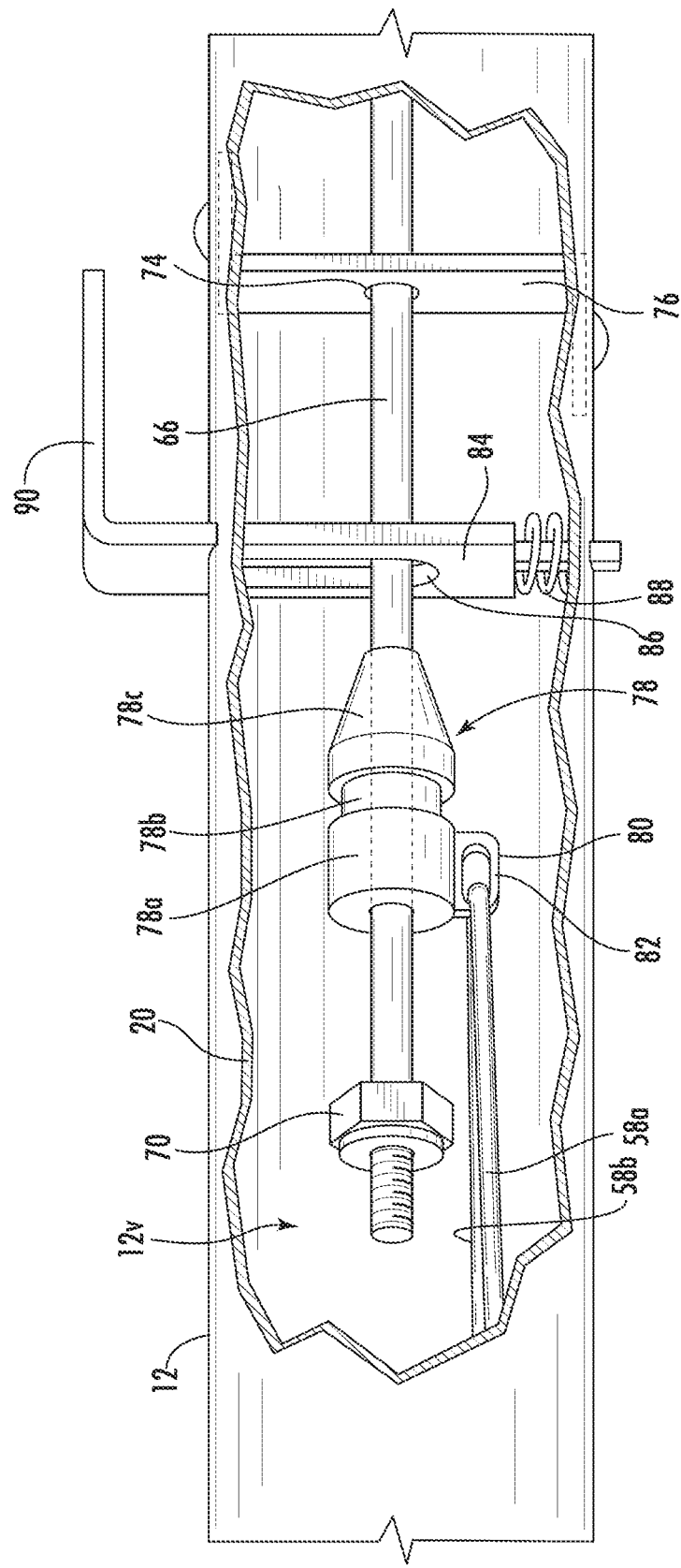
FIG. 9 is an enlarged side perspective view of various components of the cocking mechanism.
Figure 10:
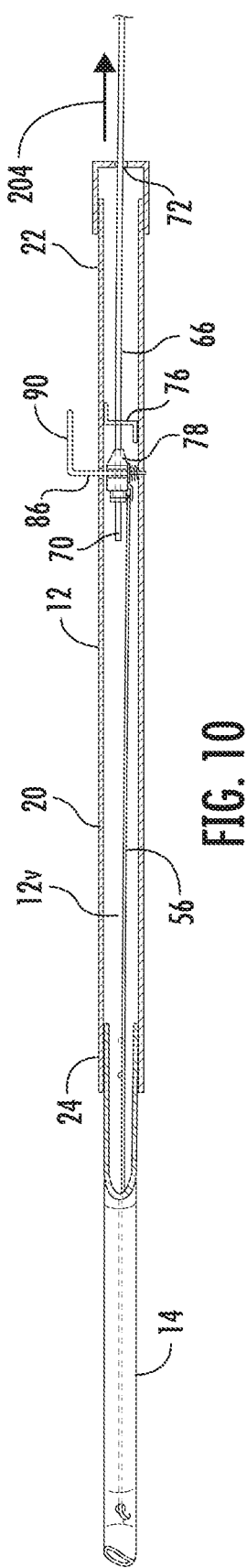
FIG. 10 is a side view of the netting apparatus of FIG. 8 with the draw bar drawn proximally to cock the cocking mechanism.
Figure 11:
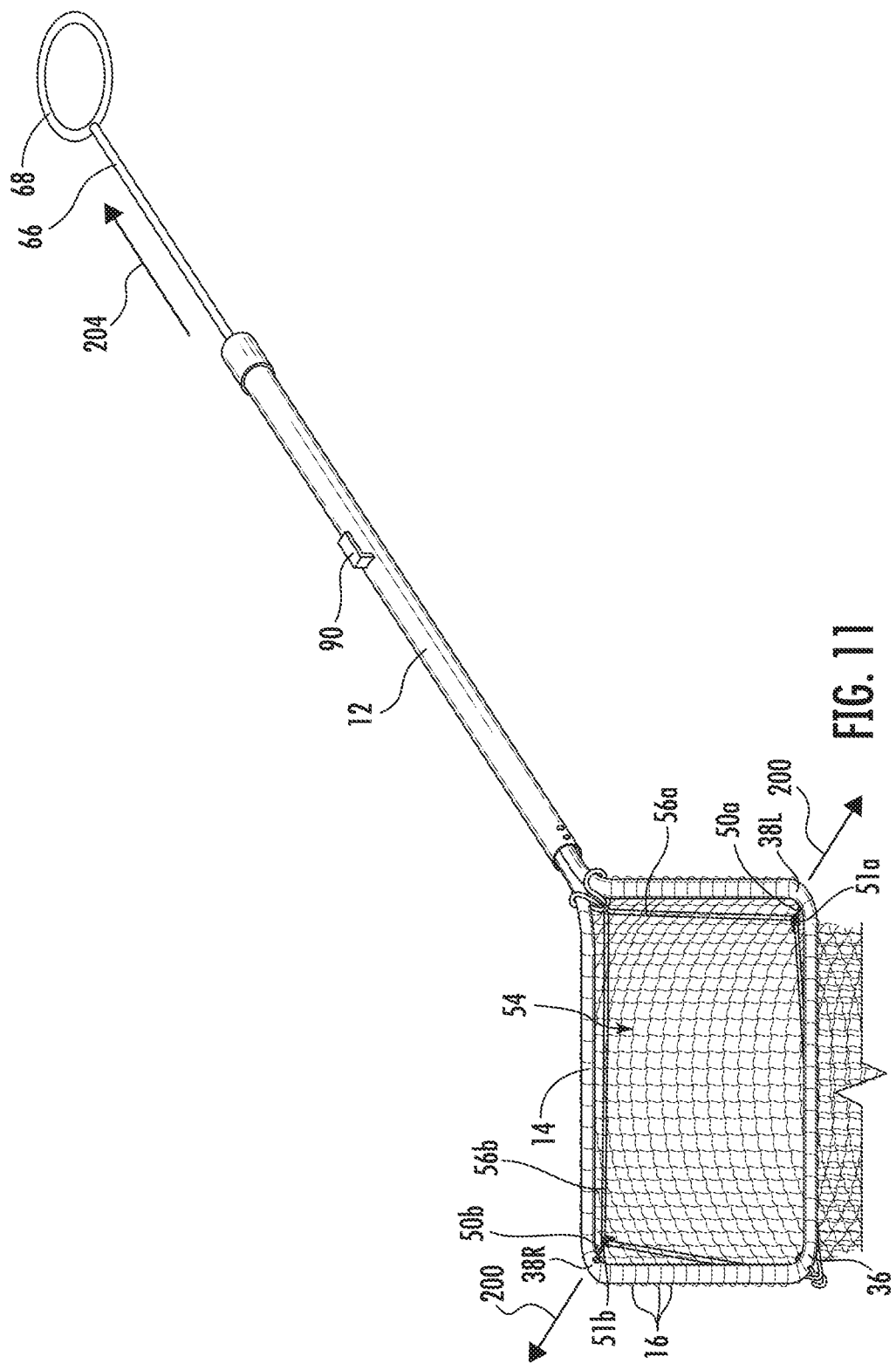
FIG. 11 is a perspective view of the netting apparatus of FIG. 10 with the draw bar drawn proximally to cock the cocking mechanism.

With additional reference to FIG. 9, an embodiment of the drawing apparatus of the subject netting apparatus 10 further comprises a drawing member 66. In one embodiment, drawing member 66 is comprised of an elongate rigid draw bar terminating proximally in pull ring 68 and distally in stop 70 which may be in the form of a lock nut or other fastener. In various embodiments, stop 70 and the distal end of draw bar 66 are reciprocally threaded for removable mounting of stop 70 onto draw bar 66. Draw bar is slidably engaged with and through a hole 72 of end cap 26 (see FIGS. 8 and 10, for example) and a bore 74 of transverse support 76. Transverse support 76 diametrically spans void 12v of handle 12 and is affixed to the interior surface of side wall 20. Hole 72 and bore 74, and thus draw bar 66 when mounted therein, are concentrically aligned with central longitudinal axis 28. The drawing apparatus further comprises a coupler 78 slidably disposed on draw bar 66 between stop 70 and support 76. Coupler 78 is coupled to draw line 56, thus indirectly coupling draw line 56 with draw bar 66. In some embodiments, coupler 78 is bullet-shaped having a distal body portion 78a and a proximal conically-shaped nose portion 78c with a recessed annular groove 78b disposed therebetween. A flange 80 projects radially from distal body portion 78a, parallel to longitudinal axis 28, and includes slot 82 through which draw line 56 may be inserted. In embodiments where two separate draw lines are employed, their proximal ends may be tied or otherwise secured to slotted flange 80.

Coupler 78 also functions as a component of a locking mechanism of the drawing apparatus. Coupler 78 is selectively and releasably in locking engagement with a second primary component of the locking mechanism, namely, spring-loaded catch 84 disposed transversely across void 12v, proximally of stop 70 and distally of support 76. Catch 84 includes an orifice 86 through which draw bar 66 is disposed. Orifice 86 is diametrically sized to permit passage of nose portion 78c of coupler 78 therethrough, but to prevent entry of distal body portion 78a alone, or alternatively in combination with, its depending flange 80. The perimeter of orifice 86 comprises a radiused edge having a width sized for mating engagement with annular groove 78b of coupler 78. A spring 88 disposed between the inner surface of side wall 20 and one end of catch 84 when compressed acts to provide a force on catch 84, orthogonal to axis 28, to bias a portion of the radiused edge into and against a portion of the circumferential surface of annular groove 78b when coupler 78 is caused to pass through orifice 86. Thusly biased against this surface, the radiused edge of orifice 86 prevents axial movement of coupler 78 along draw bar 66. The end of catch 84 opposite spring 88 extends through side wall 20 of handle 12 terminating in trigger 90 a distance above the external surface of handle 12. Manual depression of trigger 90 by a user against the force imparted by spring 88 disengages coupler 78 from catch 84.

Operation

Figure 6:
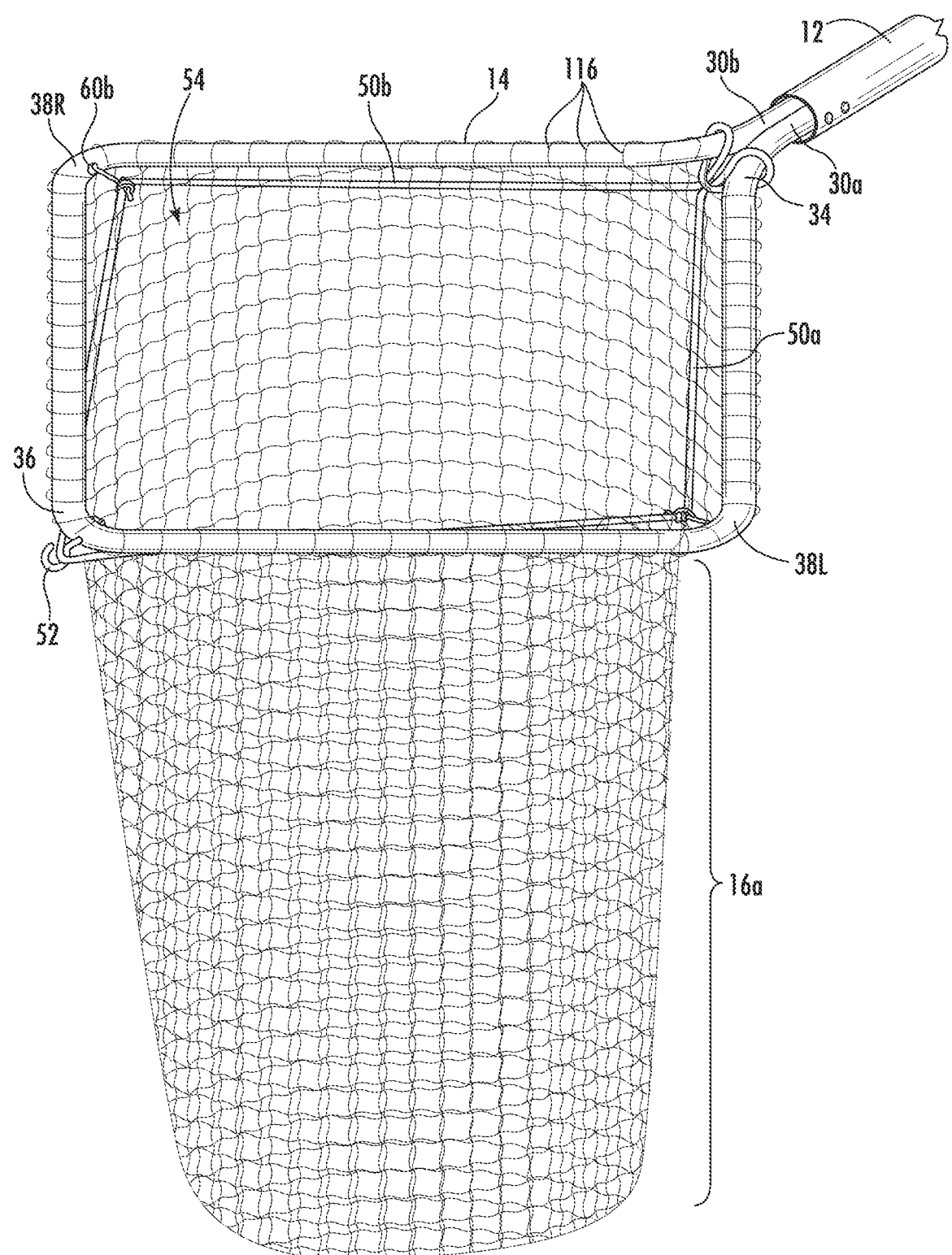
FIG. 6 is an enlarged perspective view of the net and hoop arrangement of a netting apparatus of the subject invention with the net mouth open.
Figure 7:
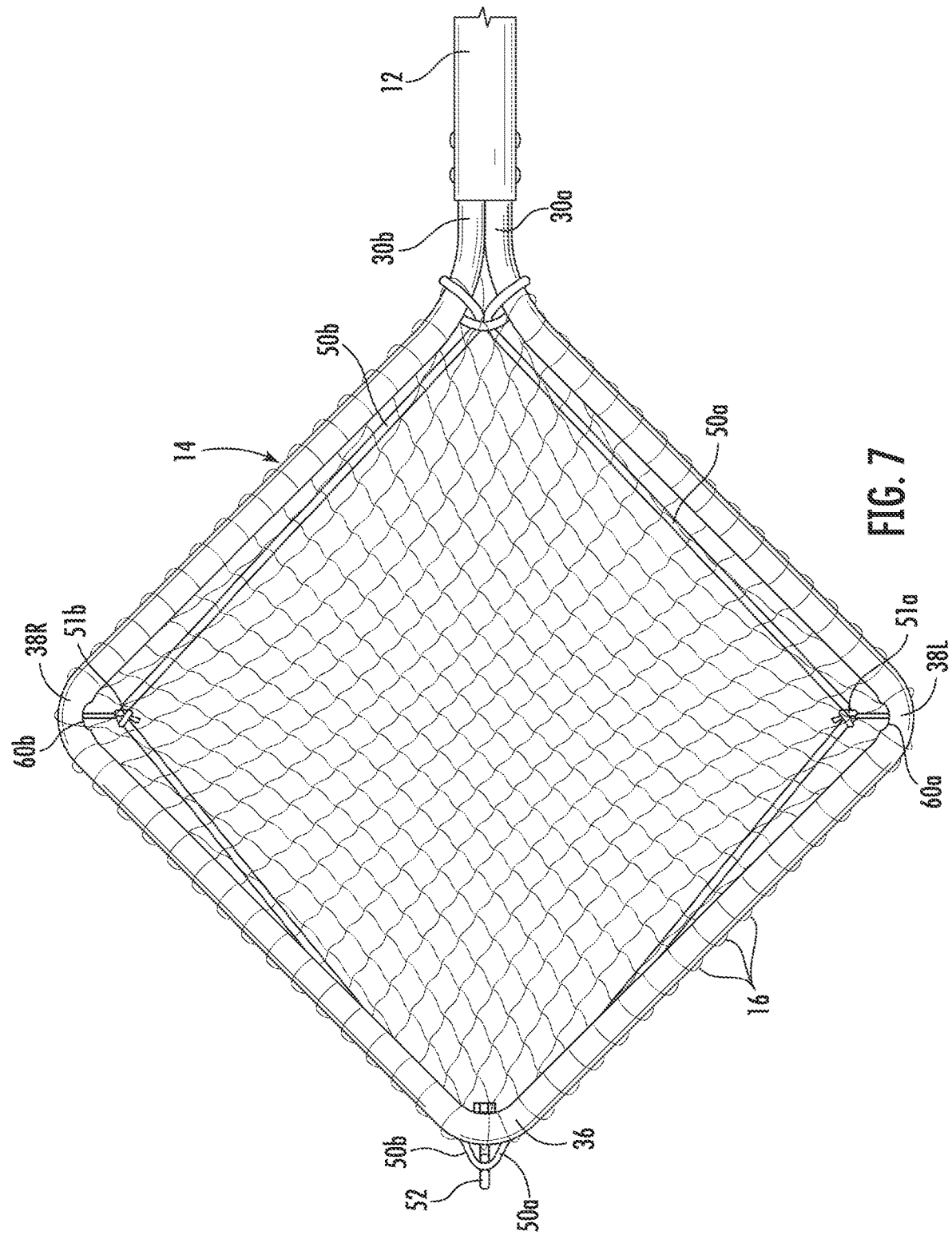
FIG. 7 is an enlarged plan view of the net and hoop arrangement of a netting apparatus of the subject invention with the net mouth open.
Figure 8:
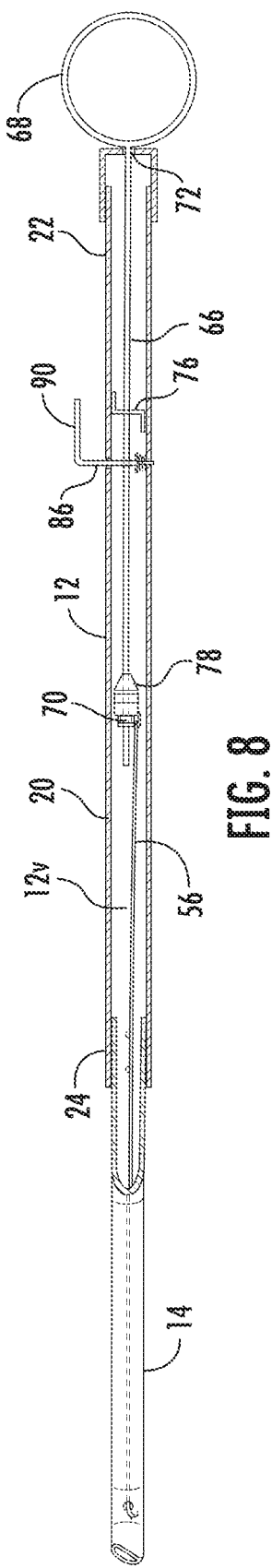
FIG. 8 is a side view of the netting apparatus, portions of which are illustrated in cutaway and phantom view to reveal the cocking mechanism.

With continued reference to FIG. 5 and additional reference to FIGS. 10-15, the operation of netting apparatus 10 is described in three stages. In a first stage (FIGS. 5, 10 and 11), draw line 56 is selectively retracted proximally a distance into handle 12 by the user pulling pull ring 68 outwardly from handle 12 as indicated by directional arrow 204 causing stop 70 to engage coupler 78 and pull it into locking engagement with catch 84. This action draws draw line portions 56a,56b into hoop 14 and handle 12 as indicated by directional arrows 202 which simultaneously causes coupled elastic bands 50a,50b to be drawn away from one another, as indicated by directional arrows 200, at junctures 51a,51b. More specifically, first draw line portion 56a acts on first elastic band 50a at first juncture 51a to draw the midpoint of first band portion 50a outwardly toward and in proximity to left corners 38L as second draw line portion 56b simultaneously acts on second elastic band 50b at first juncture 51b to draw the midpoint of second band portion 50b outwardly toward and in proximity to right corner 38R, thus opening net mouth 54 (see also FIGS. 6 and 7). To reiterate, when net mouth 54 is in an open condition it defines the sole opening of net 16 of sufficient size to permit passage of lobster or other prey into and out of net bunt 16a. Elastic bands 50a,50b are thus in a stretched, distorted (angled), and extended "cocked" condition possessing stored elastic potential energy. The locking components of the drawing apparatus, namely coupler 78 and catch 84, releasably retain elastic bands 50a,50b in the cocked condition with the net mouth 54 open. The distance each draw line portion 56a,56b is retracted into handle 12 is approximately equal to the distance between a juncture 51a or 51b and its corresponding hoop corner 38L,38R, respectively. This is approximately equal to the radius of hoop 14 and is a short distance of travel relative to netting devices of the prior art which require elaborate pully systems within the handle to manage the excessive length of draw line retraction required to close the net.

Figure 12:
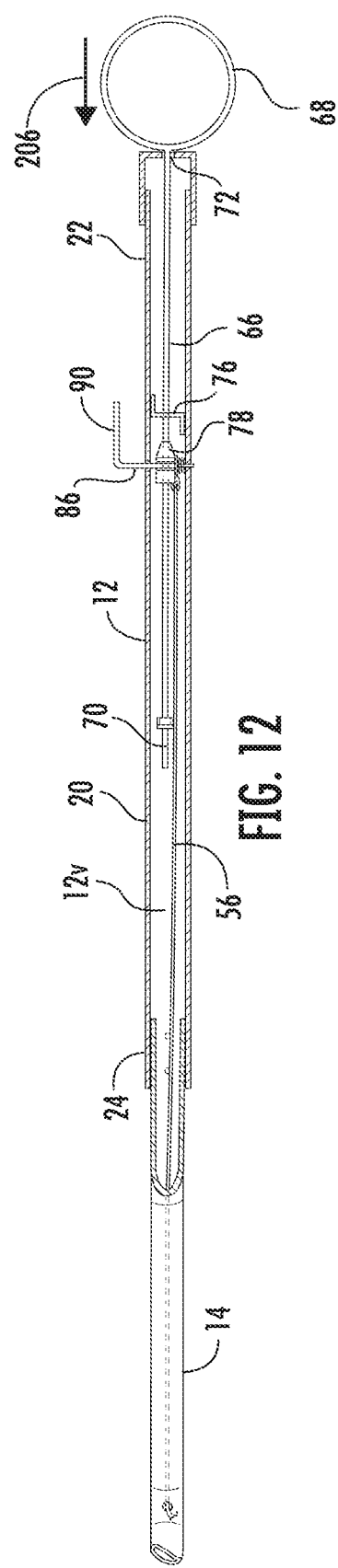
FIG. 12 is a side view of the netting apparatus of FIG. 8 in a cocked condition and with the draw bar pushed back into the handle.
Figure 13:
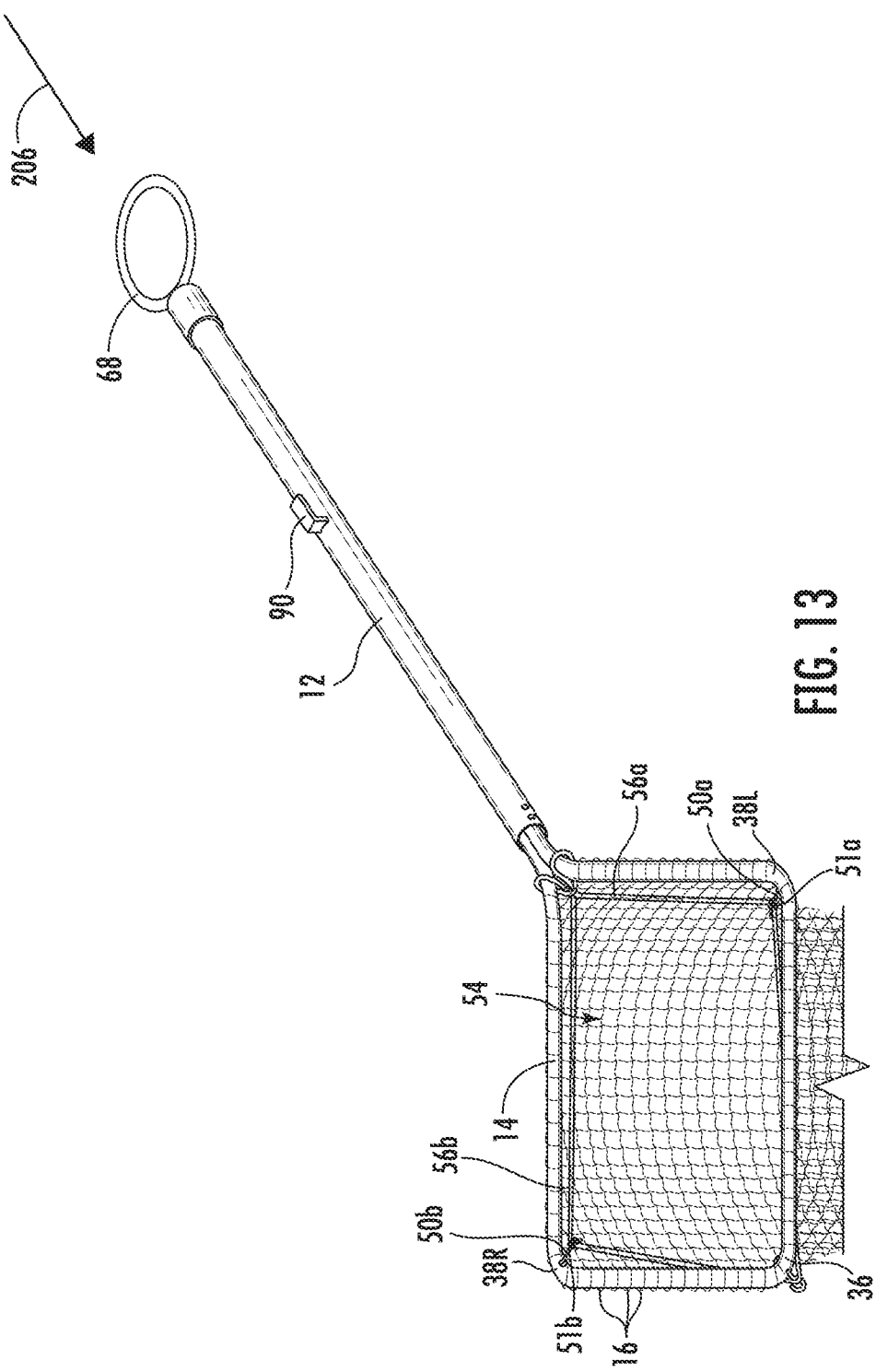
FIG. 13 is a side perspective view of the netting apparatus of FIG. 8 in a cocked condition and with the draw bar pushed back into the handle.

In a second, optional stage, once elastic bands 50a,50b have been put into the above-described cocked condition, draw bar 66 may be stowed back into handle 12 at the user's preference by merely pushing draw ring 68 distally as indicated by directional arrow 206 in FIGS. 12 and 13. It being noted that because coupler 78 is not fixedly attached to draw bar 66, but rather slidably engaged therewith, coupler 78 remains engaged with catch 84 as the draw bar is reinserted into the handle. In other embodiments, coupler 78 may be fixedly attached to draw bar 66, however, this will necessitate that the draw bar and draw ring remain extended from the handle until closure of net mouth 54 is accomplished.

Figure 14:
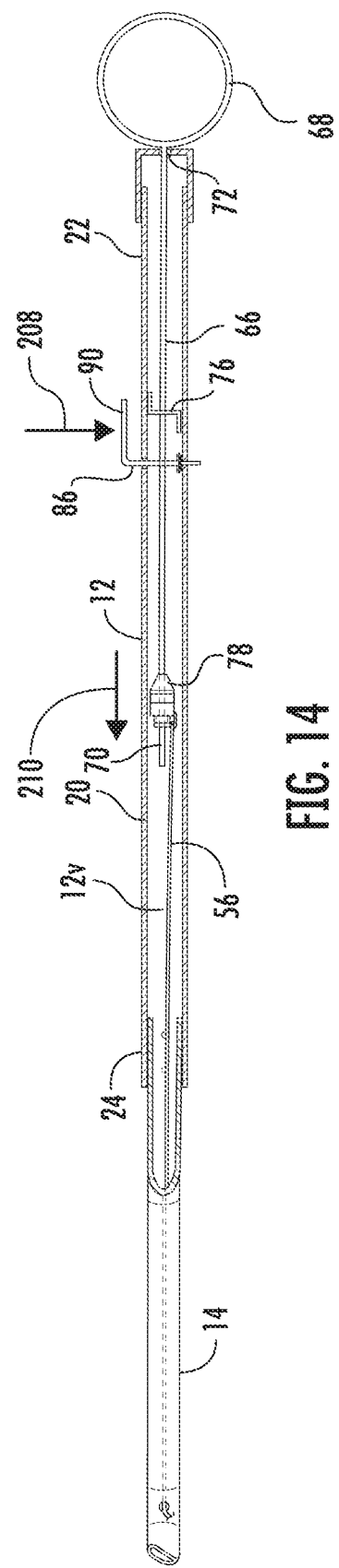
FIG. 14 a side view of the netting apparatus of FIG. 8 with the trigger deployed to release the sear and draw strings.

Referring now to FIGS. 14 and 15, closure of net mouth 54 is selectively accomplished when a sea creature is netted into net bunt 16a. In this stage, net mouth 54 is caused to rapidly close to prevent the sea creature's escape from net bunt 16b by manually depressing trigger 90 as indicated by directional arrow 208. This action causes disengagement of coupler 78 from catch 84. No longer being held in a cocked and locked condition, bands 50a,50b spring back together, returning to their undistorted shape and natural length, as the potential energy stored within them is transformed into kinetic energy. This action in turn withdraws the attached draw line portions 56a,56b from hoop 14 and handle 12 a distance equal to their initial retraction distance which, in turn, pulls coupled coupler 78 distally along draw bar 66, as indicated by directional arrow 210. In embodiments where coupler 78 are fixedly attached to draw bar 66, distal withdrawal of coupler 78 would result in the rapid retraction of draw bar back into handle 12. Users of netting apparatus 10 can retrieve the sea creature by inserting a hand through net mouth 54 (between elastic bands 50a,50b) into net bunt 16a; the bands remaining biased against the user's hand thus eliminating the need for opening of net mouth 54 via the cocking mechanism.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed as being new, useful and desired to be protected by Letters Patent of the United States is as follows:

1. A netting device, comprising,
  a) a handle comprising a substantially hollow shaft having a side wall defining a void; said shaft further comprising a proximal end and a distal end;
  b) a hoop comprising a substantially hollow tube, said hoop having a circumference defining an opening, said tube comprising a side wall defining a void; said handle being distally coupled to said hoop at a coupling point; said hoop further having an apex opposite said coupling point; said handle, said coupling point and said apex sharing a common axis, said axis dividing said hoop into a first hoop portion and a second hoop portion; said first hoop portion and said second hoop portion each having an aperture disposed therethrough; said void of said shaft being in communication with said void of said hoop;
  c) a flexible net comprising a net bunt and a net mouth; said net mouth having an open position and a substantially closed position; said net being attached to said hoop substantially around said hoop circumference to form said net bunt; said net bunt extendable to one side of said opening of said hoop;
  d) a net closure mechanism adaptable for selective movement of said net mouth to said open position or to said substantially closed position, said net closure mechanism comprising a first elastic band, a second elastic band, and a drawing apparatus; said first elastic band and said second elastic band each disposed longitudinally across said hoop opening from said attachment point to said apex; said first elastic band and said second elastic band having a space in between; said net bunt being disposed between said first elastic band and said second elastic band; said space defining the boundaries of said net mouth; said drawing apparatus comprising, a first draw line having a distal end and a proximal end, said distal end of said first draw line being attached to said first elastic band; a portion of said first elastic band being disposed through said aperture of said first hoop portion, a portion of said hoop void and a portion of said handle void; a second draw line having a distal end and a proximal end, said distal end of said second draw line being attached to said second elastic band; a portion of said second elastic band being disposed through said aperture of said second hoop portion, a portion of said hoop void and a portion of said handle void; said proximal end of said first and said second draw line being coupled to a draw member; said draw member partially disposed within said void of said handle; said draw member having an external portion adapted for manual reciprocating movement of said draw member within said void of said handle;
  whereby said first and second draw lines may be retracted proximally a distance into said handle by retracting said draw member toward said proximal end of said handle to stretch said first band outwardly toward and in proximity to said aperture of said first hoop portion, and to stretch said second band outwardly toward and in proximity to said aperture of said second hoop portion, thus placing said first and said second bands under tension and opening said net mouth; and
  whereby said net mouth may be rapidly returned its substantially closed position for capturing prey within said net bunt by releasing tension on said first and said second bands.

2. The netting device of claim 1, wherein said hoop is generally square-shape, said hoop further comprising:
  a) a proximal corner situate at said coupling point;
  b) an opposing distal corner situate at said apex;
  c) a left corner situate at the midpoint of said first hoop portion; and
  d) a right corner situate at the midpoint of said second hoop portion; said left corner and said right corner sharing an axis orthogonal to said axis shared by said coupling point and said apex.

3. The netting device of claim 2, wherein said aperture of said first hoop portion is disposed through the inner bend of said left corner, and said aperture of said second hoop portion is disposed through the inner bend of said right corner.

4. The netting device of claim 1, wherein said first elastic band and said second elastic band together form a single elastic band.

5. The netting device of claim 4, wherein said single elastic band is a loop.

6. The netting device of claim 1, wherein said distal end of said first draw line is attached to the midpoint of said first elastic band, and said distal end of said second draw line is attached to the midpoint of said second elastic band.

7. The netting device of claim 6, wherein said first draw line and said second draw line together form a single draw line.

8. The netting device of claim 1, wherein said first elastic band and said second elastic band are.

9. The netting device of claim 1, wherein said proximal end of said first and said second draw line are coupled to said draw member via a coupler slidably disposed on said draw bar.

10. The netting device of claim 9, further comprising a spring-loaded catch disposed transversely across said void of said handle, said catch having an orifice, said draw bar being disposed through said orifice, said coupler being selectively and releasably in locking engagement with said catch.

11. The netting device of claim 10, wherein one end of said catch extends through said side wall of said handle and terminates in a trigger, whereby manual depression of said trigger disengages said coupler from said catch thereby releasing said tension on said first and said second elastic bands to close said net mouth.

* * * * *